Patented Dec. 13, 1949

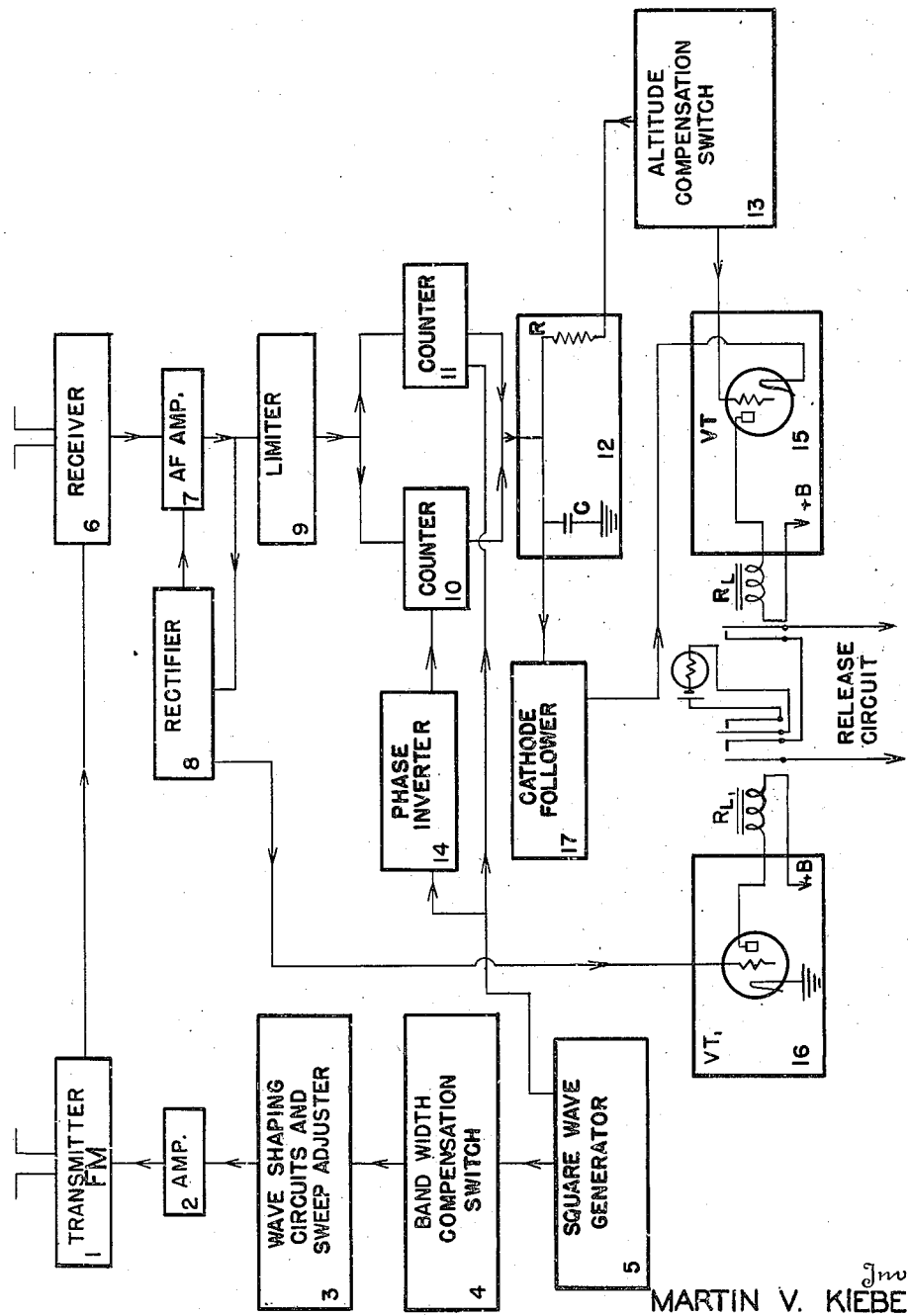

2,490,816

UNITED STATES PATENT OFFICE 2,490,816

AUTOMATIC BOMB RELEASE CIRCUIT DETAILS

Martin V. Kiebert, Jr., United States Navy, Arlington, Va.

Application January 19, 1945, Serial No. 573,617

7 Claims. (Cl. 343—7)

(Granted under the act of March 3, 1883, as amended April 30, 1928; 370 O. G. 757)

This invention relates to radar bomb release device, and is particularly directed to an improvement in such devices.

The primary object is to provide a bomb release which will not make false releases.

Other objects and advantages will become apparent from the following specification and claims in connection with the accompanying drawings.

The figure is a block diagram of the system incorporating the invention.

The purpose of the system of this invention is to effect automatically the release of a bomb or other missile from a low flying aircraft directetd at an isolated or semi-isolated marine surface vessel. The bomb may be caused to drop at the proper time to hit the surface in the close vicinity of the target, or at a preselected distance ahead of the target. The problem to be solved by the equipment requires that the following conditions be determined and evaluated:

1. Height of the plane above sea level.
2. Horizontal distance to the target.
3. Relative horizontal speed between plane and target.

The plane may be flown at a preselected altitude with the aid of an absolute altimeter, and the equipment be designed for operation at several predetermined altitudes. This will take care of condition 1 above. Condition 2 is indirectly determined by measuring the slant distance from the plane to the target by frequency modulation radar equipment. An antenna array is used to beam the high frequency waves forward but sufficiently downward to be reflected back from surface vessels. Thus, the time required for the signal to travel from the plane to the target and back again, and hence the distance may be evaluated. Condition 3 is evaluated in terms of slant relative speed between the plane and target by utilizing the Doppler effect produced by the rapid approach of the plane.

Since this equipment is designed for use at low altitude, it is assumed that the time of fall of a projectile is the same as that of a projectile in free space, and air resistance is neglected. It is also assumed that the forward velocity of the projectile is maintained constant up to the point of impact.

The system has been designed to automatically account for the above conditions for each of a number of preset altitudes by a compensation switch. Since each altitude requires a different slope, or time factor, as determined by curves of the falling bomb; the equipment has been designed to give this required slope by an appropriate control of the bandwidth swept by the transmitter 1. Hence, the bandwidth is a predetermined function of the time of drop plus the delay due to mechanical and electrical inertia.

As in frequency modulated altimeters, the beat frequency output of the detector will be proportional, among other factors, to the frequency band swept by the transmitter. The frequency modulated signal is transmitted to and reflected back from the target. The instantaneous frequency of the reflected signal lags the instantaneous frequency of the transmitted signal by $$\frac{2D}{C} \text{ seconds}$$

where D is the distance from the transmitter to the target in feet, and C is the speed of light in feet per second. Since a portion of the energy of the transmitter is fed directly into the detector, the transmitter signal and the reflected signal will heterodyne in the detector to produce a resultant low frequency beat note whose frequency will be proportional to the distance to the target. The number of cycles per second per foot of distance to the target may be varied directly by varying the sweep width. This is readily done by varying the driving voltage to the modulator.

Since the distance from the target at which the missile must be released is dependent upon the forward speed of the aircraft relative to the target, as well as the altitude, it is necessary that this speed be evaluated by the equipment. Use is made, therefore, of the Doppler effect caused by the approach of the plane toward the target.

Due to this effect when the transmitted and received signals are mixed in the detector 6, two audio frequencies will occur, one during the increase in frequency, or upsweep, of the wave, and the other during the decrease or downsweep. These frequencies are composed of both distance and speed factors, and the upsweep is the difference, and the downsweep the sum, of the distance and speed variables. The equipment constantly measures these two variables in terms of the preset altitude; and when they bear the proper relation, the bomb release is actuated.

The transmitter 1 consists of ultra high frequency equipment, frequency modulated by a mechanically vibrating condenser. This modulator is operated by a square wave generator 5 the output of which is fed thru wave shaping circuits and sweep adjusting means 3 and amplifiers 2 whose functions are to produce linear frequency modulation of the transmitter 1. A compensation switch 4 is provided at the output of square wave generator 5 for changing the sweep width of the transmitter 1 proportional to the time of free fall of a bomb and compensates for distance intercept. A portion of the signal from the transmitter 1 is fed to the receiver 6 to beat with the reflected signals. The low frequency beats resulting therefrom are amplified at amplifier 7 and converted into square waves by passing thru a limiter circuit 9. The square wave is then applied to a differential counter circuit 10, 11, and 12 which is employed to derive a voltage which is proportional to frequency. It is highly desirable that the output voltage of the circuit 10, 11, and 12 be linear with respect to input frequency. Two counters are set up and arranged so that one operates only during the upsweep in frequency and the other operates during the downsweep. This is done by application of control voltages from the square wave generator 5 directly to counter 11 and after phase inversion by means of phase inverter 14, to counter 10, which renders the counters separately operable at the proper time and synchronizes them with the sweep circuit 3 of the transmitter 1.

The counter 10 operates during the upsweep in frequency and counter 11 operates during the downsweep in frequency. The upsweep counter 10 developes a positive voltage proportional to distance minus speed in the common load consisting essentially of the condenser C and resistance R shown at 12 in addition to the compensating resistance existing in the altitude compensation switch 13. The downsweep counter 11 develops a negative voltage proportional to distance plus speed into the same common load. In order that the distance voltage will not cancel out in the common load, the sensitivity of the upsweep counter 10 has been made greater than that of the downsweep counter 11. The resultant direct current voltages then simultaneously present in the common load are a positive voltage proportional to the distance and a negative voltage proportional to speed. The cathode follower 17 is used to transfer the differential output appearing at the common load without changing amplitude or phase to the cathode of the relay amplifier tube 15 and so operates the relay $R_L$ connected thereto. When a predetermined value is reached, this relay $R_L$ will be actuated to close its release circuit. The cathode follower 17 at the same time serves as an impedance transformer and as a unidirectional isolation between the load and the relay amplifier tube 15.

It has been found in using these devices that, under certain conditions, fading, multiple path transmission, or complex targets may cause a temporary change in range signals. When this occurs the condenser C may charge rapidly in a reverse direction and thereby cause the tube 15 to actuate relay $R_L$ and cause a false release.

The magnitude and duration of fading is of course most severe at a distance from the target while the direct reflection from the sea is constant, thus frequently resulting in a false release prior to receiving a satisfactory signal.

Such false releases are ordinarily minimized by the use of a high pass filter in the audio circuit. Since the wave reflected directly from the surface of the sea produces a compartively low audio frequency, undesirable effects are reduced. Due consideration must be given to the sweep width, velocity rates, and altitudes in such devices. This method is commonly used in the system of the figure.

Other devices for preventing false releases may prevent the release relay from operating, or may prevent the condenser C from reversing its charge when the range signal fades and a false reflection is still present. These results may be accomplished by biasing a tube, or by other means.

The present invention provides a positive means for preventing premature closing of the release circuit by opening that circuit at a point separate and distinct from relay $R_L$, and is illustrated in the figure at the tube 16 and $R_{L1}$.

In the invention the bomb release circuit is maintained in a normally open condition by $R_{L1}$ until a signal of sufficient amplitude and duration is received. This is determined by proper delay bias and time constants in the amplifier tube 16, and in the rectifier 8 which controls the amplifier tube 16 by providing a signal bias voltage proportional to the amplitude and duration of the received signal. Rectifier tube 8 also automatically decreases the high frequency response of the amplifier 7 as a function of received signal strength. Relay $R_{L1}$ is arranged to maintain the release circuit open except in the presence of a signal of desired characteristics. Thus the release mechanism will not be actuated until both relays are simultaneously operated.

The pilot light serves to indicate when a proper signal is being received. Another such light can obviously be used in the circuit of $R_L$, or in the release circuit itself.

It is obvious that various modifications may be made, and that $R_{L1}$ may be normally closed instead of open, if the characteristics of the release circuit so require.

While the invention has been described in conjunction with specific arrangements of components, it should be expressly understood that various changes and substitutions may be made without departing from the spirit of the invention, as defined in the appended claims.

The invention described herein may be manufactured and used by or for the Government of the United States of America for governmental purposes without the payment of any royalties thereon or therefor.

What is claimed is:

1. In automatic bomb release apparatus of the character disclosed for use in moving aircraft for bombing a target, in combination, square wave generator means including a band width compensating switch, a radio transmitter operatively connected to said square wave generator means for emitting a frequency modulated wave having a characteristic controlled by the square wave and the setting of said switch, said switch being adjusted to a preselected position corresponding to the absolute altitude of the aircraft, receiver means for receiving the reflected wave, said receiver means being adapted to produce two signals of two beat frequencies respectively, one beat frequency being proportional to the distance between aircraft and target plus the speed of the aircraft with respect to the target, the other beat frequency being proportional to said distance minus said speed, amplifier means energized from said receiver means, limiter means energized from said amplifier means for producing from said two beat frequency signals two substantially square wave signals, a pair of counter means operatively connected to said limiter means to be energized by said square wave signals respectively, one of said counter means being connected to said square wave generator means to be controlled therefrom whereby said last named counter means counts the pulses of only one of said square wave signals, phase inverter means, the other of said counter means being operatively connected to said square wave generator means by way of said phase inverter means, said other counter means counting only the pulsations of the other of said square wave signals, integrator circuit means connected to both said counter means and energized therefrom, first and second relays, a bomb release circuit including the contacts of both said first and second relays, first and second electron discharge tubes each having a control grid, means including said first and second electron discharge tubes connected to said first and second relays respectively and adapted to control the energizations thereof in accordance with the values of the potentials on the respective control grids, rectifier means energized from said amplifier means for generating a voltage proportional to the duration and amplitude of the receiver signals, the control grid of said first electron discharge tube being connected to said rectifier means and having said direct current voltage applied thereto, and an altitude compensation switch, the control grid of said second electron discharge tube being connected to said integrator circuit by way of said altitude compensation switch.

2. In automatic bomb release apparatus of the character disclosed for use aboard aircraft for bombing a moving target wherein the output of a square wave generator is utilized to frequency modulate a radio wave, said radio wave being received and utilized to obtain two beat frequency signals, one of said signals corresponding in frequency to the distance between aircraft and target plus the speed of the aircraft with respect to the target, the other of said beat frequency signals corresponding in frequency to said distance minus said speed, in combination, rectifier means for producing a direct current voltage proportional to the combined amplitudes and durations of said signals, counter means controlled from said square wave generator and adapted to separately count the alternations of said beat frequency signals, first and second relays, a bomb release circuit including the contacts of both said relays, means connected to said first relay and to said counter means for energizing said first relay to close the contacts thereof upon preselected values of said beat frequencies, means including an electron discharge tube having a control grid and operatively connected to said second relay for energizing said second relay to close the contacts thereof when the potential on said control grid assumes a predetermined value, said control grid being connected to said rectifier means and having said direct current voltage applied thereto, said second relay preventing the premature closing of said bomb release circuit, and means connected to said second relay for indicating when the contacts of said second relay are closed thereby to indicate the readiness of said bomb release circuit.

3. In automatic bomb release apparatus of the character disclosed for use on moving aircraft for bombing a moving target, and employing master control means to frequency modulate a radio transmitter and emit a radio wave frequency modulated at a predetermined rate and band width preselected in accordance with the altitude of the aircraft, and receiver means for receiving said radio wave and generating two beat frequency signals, one of said signals corresponding in frequency to the distance between aircraft and target plus the speed of the aircraft with respect to the target, the other of said beat frequency signals corresponding in frequency to said distance minus said speed, in combination, rectifier means for generating a direct current voltage proportional to the combined amplitudes and durations of said signals, counter means controlled from said master control means and adapted to separately count the alternations of said beat frequency signals, first and second relays both adapted when energized to close the contacts thereof, a bomb release circuit including the contacts of both said relays, means including altitude compensating means and connecting said first relay to said counter means for energizing said first relay when said beat frequencies have preselected values, and means including an electron discharge tube having a control grid and operatively connected to said second relay for energizing said second relay when the potential on said control grid assumes a predetermined value, said control grid being connected to said rectifier means to have said direct current voltage applied thereto, said second relay preventing the premature closing of said bomb release circuit.

4. In automatic bomb release apparatus of the character disclosed for use on moving aircraft for bombing a moving target, and employing master control means to frequency modulate a radio transmitter and emit a radio wave frequency modulated at a perdetermined rate and band width preselected in accordance with the altitude of the aircraft, and receiver means for receiving said radio wave and generating two beat frequency signals corresponding in frequency to the distance between aircraft and target plus the speed of the aircraft with respect to the target, the other of said beat frequency signals corresponding in frequency to said distance minus said speed, in combination, rectifier means for generating a direct current voltage proportional to the combined amplitudes and durations of said signals, counter means controlled from said master control means and adapted to separately count the alternations of said beat frequency signals and generate a control voltage proportional thereto, first and second relays both adapted when energized to close the contacts thereof, a bomb release circuit including the contacts of both said relays, means including a first electron discharge tube having a first control grid for energizing said first relay when the potential on said first control grid assumes a predetermined value, means including altitude compensating means and interconnecting said first relay and first electron discharge tube to said counter means for applying said control voltage from said counter means to said first control grid and energizing said first relay when said beat frequencies have preselected values, means including a second electron discharge tube having a second control grid and operatively connected to said second relay for energizing said second relay when the potential on said second control grid assumes a predetermined value, said second control grid being connected to said rectifier means to have said direct current voltage applied thereto, said second relay preventing the premature closing of said bomb release circuit, and means connected to said second relay for indicating when the contacts of said second relay are closed thereby to indicate the readiness of said bomb release circuit.

5. In automatic bomb release apparatus of the character disclosed for use on moving aircraft for bombing a moving target, and employing master control means to frequency modulate a radio transmitter and emit a radio wave frequency modulated at a predetermined rate and band width preselected in accordance with the altitude of the aircraft, and receiver means for receiving said radio wave and generating two beat frequency signals, one of said signals corresponding in frequency to the distance between aircraft and target plus the speed of the aircraft with respect to the target, the other of said beat frequency signals corresponding in frequency to said distance minus said speed, in combination, rectifier means for generating a direct current voltage proportional to the combined amplitudes and durations of said signals, counter means controlled from said master control means and adapted to separately count the alternations of said beat frequency signals and generate a control voltage proportional thereto, first and second relays both adapted when energized to close the contacts thereof, a bomb release circuit including the contacts of both said relays, means including a first electron discharge tube having a first control grid and operatively connected to said first relay for energizing said first relay when the potential on said first control grid assumes a predetermined value, means including altitude compensating means and interconnecting said first relay and first electron discharge tube to said counter means for applying said control voltage from said counter means to said first control grid and energizing said first relay when said beat frequencies have preselected values, and means including a second electron discharge tube having a second control grid and operatively connected to said second relay for energizing said second relay when the potential on said second control grid assumes a predetermined value, said second control grid being connected to said rectifier means to have said direct current voltage applied thereto, said second relay preventing the premature closing of said bomb release circuit, and means operatively connected to said second relay for indicating when said second relay becomes energized thereby to indicate the readiness of said bomb release circuit to operate to release the bomb.

6. In automatic bomb release apparatus of the character disclosed for use in moving aircraft for bombing a target, in combination, square wave generator means including a band width compensating switch, a radio transmitter operatively connected to said square wave generator means for emitting a frequency modulated wave having a characteristic controlled by the square wave and the setting of said switch, said switch being adjusted to a preselected position corresponding to the absolute altitude of the aircraft, receiver means for receiving the reflected wave, said receiver means being adapted to produce two signals of two beat frequencies respectively, one beat frequency being proportional to the distance between aircraft and target plus the speed of the aircraft with respect to the target, the other beat frequency being proportional to said distance minus said speed, amplifier means energized from said receiver means, limiter means energized from said amplifier means for producing from said two beat frequency signals two square wave signals, a pair of counter means operatively connected to said limiter means to be energized by said square wave signals respectively, one of said counter means being connected to said square wave generator means to be controlled therefrom whereby said last named counter means counts the pulses of only one of said square wave signals, phase inverter means, the other of said counter means being operatively connected to said square wave generator means by way of said phase inverter means, said other counter means counting only the pulsations of the other of said square wave signals, integrator circuit means connected to both said counter means and energized therefrom, first and second relays, a bomb release circuit including the contacts of both said first and second relays, first and second electron discharge tubes each having a control grid, means including said first and second electron discharge tubes connected to said first and second relays respectively and adapted to control the energizations thereof in accordance with the values of the potentials on the respective control grids, rectifier means energized from said amplifier means, the control grid of said first electron discharge tube being connected to said rectifier means, an altitude compensation switch, the control grid of said second electron discharge tube being connected to said integrator circuit means by way of said altitude compensation switch, and means operatively connected to said second relay for indicating when said second relay becomes energized thereby to indicate the readiness of said bomb release circuit to operate to release the bomb.

7. In automatic bomb release apparatus of the character disclosed for use aboard aircraft for bombing a moving target wherein a transmitted radio wave is frequency modulated, said radio wave being received and utilized to obtain two beat frequency signals, one of said signals corresponding in frequency to the distance between aircraft and target plus the speed of the aircraft with respect to the target, the other of said beat frequency signals corresponding in frequency to said distance minus said speed, and in which counter means and integrator circuit means are utilized to derive a control voltage from said beat frequency signals, said beat frequency signals also being rectified and amplified to obtain a safety signal proportional in amplitude to the duration and amplitude of said beat frequency signals, in combination, first relay means having said safety signal applied thereto and energized when said safety signal has a predetermined value, indicating means operatively connected to said first relay means for indicating when said first relay means is energized, second relay means, a bomb release circuit including the contacts of both said first and second relay means, an amplifier operatively connected to said second relay means to control the energization thereof, and adjustable altitude compensator means operatively connecting said amplifier means to said integrator means for energizing said second relay means by said control signal when said beat frequency signals have predetermined values and said altitude compensator means is adjusted to a preselected setting.

MARTIN V. KIEBERT, Jr.

REFERENCES CITED

The following references are of record in the file of this patent:

UNITED STATES PATENTS

| Number | Name | Date |
|---|---|---|
| 2,264,063 | Bond | Nov. 25, 1941 |
| 2,409,448 | Rost | Oct. 15, 1946 |
| 2,416,223 | Sanders | Feb. 18, 1947 |
| 2,420,016 | Sanders | May 6, 1947 |
| 2,420,017 | Sanders | May 6, 1947 |
| 2,433,284 | Luck | Dec. 23, 1947 |